(12) United States Patent
Murthy et al.

(10) Patent No.: US 11,774,319 B2
(45) Date of Patent: Oct. 3, 2023

(54) METHOD OF DESIGNING A FIXTURE FOR A VIBRATION TESTING SYSTEM AND A VIBRATION TESTING SYSTEM HAVING THE TEST FIXTURE

(71) Applicant: The Boeing Company, Chicago, IL (US)

(72) Inventors: Harsha Ramachandra Murthy, Bangalore (IN); Sriram N. Krishnaprasad, Bangalore (IN)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/588,857

(22) Filed: Jan. 31, 2022

(65) Prior Publication Data
US 2023/0243716 A1   Aug. 3, 2023

(51) Int. Cl.
*G01M 7/02*   (2006.01)

(52) U.S. Cl.
CPC ............ *G01M 7/022* (2013.01); *G01M 7/027* (2013.01)

(58) Field of Classification Search
CPC .............................. G01M 7/022; G01M 7/027
See application file for complete search history.

(56) References Cited

U.S. PATENT DOCUMENTS

| | | | | |
|---|---|---|---|---|
| 2008/0139374 A1* | 6/2008 | LeFeuvre | .............. | G01M 7/027 73/382 G |
| 2016/0299032 A1* | 10/2016 | Gibson | ................ | G01M 7/027 |
| 2021/0025915 A1* | 1/2021 | Takizawa | ................. | G01P 3/44 |

OTHER PUBLICATIONS

Kara Buckley and Lee Chiang, Design Principles for Vibration Test Fixtures, Oct. 27, 2010, https://digital.wpi.edu.

* cited by examiner

*Primary Examiner* — Suman K Nath
(74) *Attorney, Agent, or Firm* — Quinn IP Law (57) ABSTRACT

A method of designing a test fixture configured to mount to a vibration slip table and fix a test article to the vibration slip table during a vibration test includes performing finite element analysis using one or more boundary conditions determined from parameters of the vibration slip table, the test article, or the vibration test to optimize a topology of the test fixture, and outputting a geometric model of the test fixture having the optimized topology. Another method of designing a test fixture includes inputting the one or more boundary conditions into a topology optimizing solver. A vibration test system includes a test fixture designed according to the method.

17 Claims, 7 Drawing Sheets

| Zone | Category | Region |
|---|---|---|
| 1 | Category A | Fuselage |
| 2 | Category B | Racks |
| 3 | Category C | Empennage |
| 4 | Category D | Wing |
| 5 | Category E | Engine & Strut |

METHOD OF DESIGNING A FIXTURE FOR A VIBRATION TESTING SYSTEM AND A VIBRATION TESTING SYSTEM HAVING THE TEST FIXTURE

TECHNICAL FIELD

The disclosure relates to a method of designing a test fixture for a vibration testing system and to a vibration testing system having the test fixture. An example test article may be an aircraft component.

BACKGROUND

Many objects are subjected to vibrations and associated shocks during the use for which they are designed. In some fields, objects are tested according to a vibration test conducted using a vibration test system in order to ensure that the articles withstand the vibrations that they may incur during use. The results of the vibration test help to inform the design and manufacture of the object. Some vibration test systems include a vibration slip table and one or more test fixtures used to fix a test article to the vibration slip table.

SUMMARY

A vibration test fixture used to fix a test article to a slip table in a vibration testing system may sufficiently hold the test article to the slip table but, if larger than necessary, may make the logistics of installing or moving the test fixture difficult, and may necessitate a larger slip table due to the added weight. Additionally, the added weight could inadvertently affect the vibration response of the test article that it fixes to the slip table. Furthermore, a non-optimized test fixture may have a natural frequency of vibration that causes resonances and nulls with the frequencies of the test article vibrations during the test, making it difficult to ascertain the resonance attributable to the test article. It can be difficult to efficiently design a vibration test fixture that avoids these issues.

A method of designing a test fixture for a vibration test system and a vibration test system having such a test fixture are disclosed herein that optimize the topology of the test fixture via finite element analysis using one or more boundary conditions determined from parameters of the vibration slip table, the test article, or the vibration test to optimize a topology of the test fixture. In short, these parameters are specific to the physical structure of the test system, the physical structure of the test article, or aspects of the vibration test itself, and enable a well-designed test fixture that likely weighs less than current test fixtures, has a stiffness sufficient to withstand test loads, and avoids vibration resonances with the test article.

In one example, a method of designing a test fixture configured to mount to a vibration slip table and fix a test article to the vibration slip table during a vibration test includes performing finite element analysis via a topology optimizing module of a computer system, using one or more boundary conditions determined from parameters of the vibration slip table, the test article, or the vibration test to optimize a topology of the test fixture, and outputting from the computer system a geometric model of the test fixture having the optimized topology.

The one or more boundary conditions may include a g-load parameter. The g-load parameter may be converted from a selected power spectral density curve according to which the motive source of the vibration testing system is powered to vibrate the vibration slip table according to the vibration test. The selected power spectral density curve may be one of a plurality of power spectral density curves stored in the computer system, each of the power spectral density curves corresponding with a different zone of vibration frequencies, and the zone of vibration frequencies of the selected power spectral density curve corresponding with a predetermined g-load requirement of the test article.

The one or more boundary conditions may include a natural frequency of vibration of the test fixture that is greater than a predetermined maximum frequency of vibration of a resonance scan of the test article that is conducted during the vibration test.

The one or more boundary conditions may include a test fixture mounting position at which the test fixture is mounted on the vibration slip table.

The one or more boundary conditions may include a test article mounting position at which the test fixture is mounted on the test article.

Performing the finite element analysis according to the method may include using a material strength characteristic of a material of the test fixture as an additional boundary condition.

In another example, a method of designing a test fixture configured to mount to a vibration slip table and fix a test article to the vibration slip table during a vibration test includes inputting one or more boundary conditions into a computer system having a topology optimizing module, the one or more boundary conditions determined from parameters of the vibration slip table, the test article, or the vibration test. The topology optimizing module is configured to perform finite element analysis based on the one or more boundary conditions to provide a geometric model of the test fixture having an optimized topology.

In an example, a vibration testing system for conducting a vibration test on a test article includes a vibration slip table, a test fixture configured to mount to the vibration slip table and configured to fix the test article to the vibration slip table, and a motive source operatively connected to the vibration slip table and operable to vibrate the vibration slip table according to the vibration test. The test fixture has a topology optimized according to a finite element analysis performed using one or more boundary conditions determined from parameters of the vibration slip table, the test article, or the vibration test.

The features, functions, and advantages that have been discussed can be achieved independently in various embodiments or may be combined in yet other embodiments further details of which can be seen with reference to the following description and drawings. The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The drawings described herein are for illustrative purposes only, are schematic in nature, and are intended to be exemplary rather than to limit the scope of the disclosure.

DETAILED DESCRIPTION

As disclosed herein, a method of designing a test fixture for a vibration testing system (such as carried out by a computer system), a method of designing a test fixture for a vibration testing system (such as carried out by a designer using the computer system), and a vibration testing system that includes the test fixture take into account various physical parameters of the vibration testing system, the test article to be tested on the vibration testing system, as well as aspects of the vibration test itself. These parameters and aspects are used as boundary conditions in a finite element analysis performed by a topology optimization module of the computer system to provide a geometric model of the test fixture. A test fixture manufactured according to the geometric model should perform its function of fixing the test article to the vibration slip table without inadvertently influencing the test results. For example, the test fixture should be lighter in weight than typical test fixtures and should have a natural frequency of vibration that will not cause resonance with a natural frequency of vibration of the test article during the vibration test.

Figure 1:
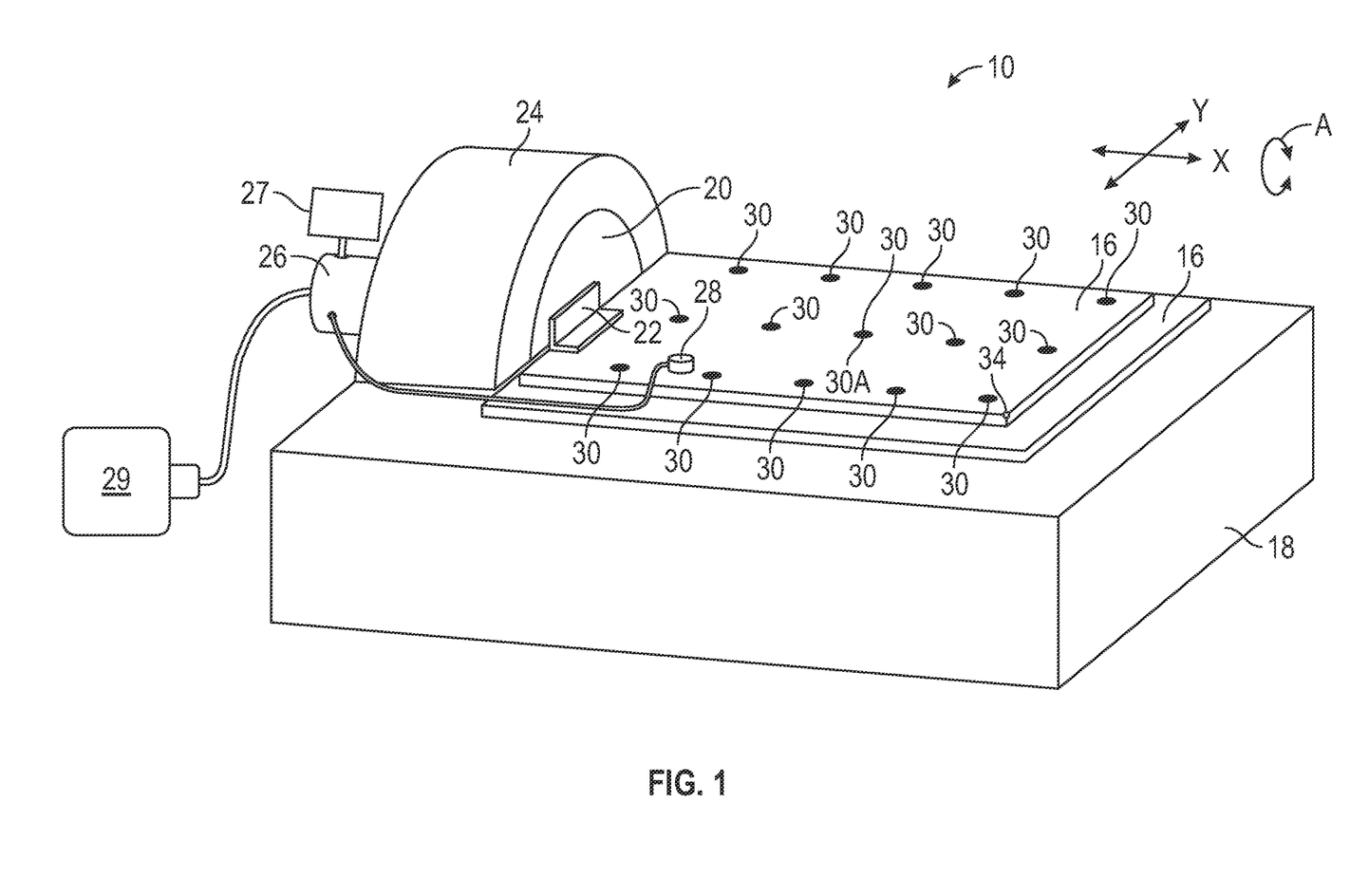
FIG. 1 is a perspective view of a portion of an example vibration testing system including a vibration slip table.
Figure 2:
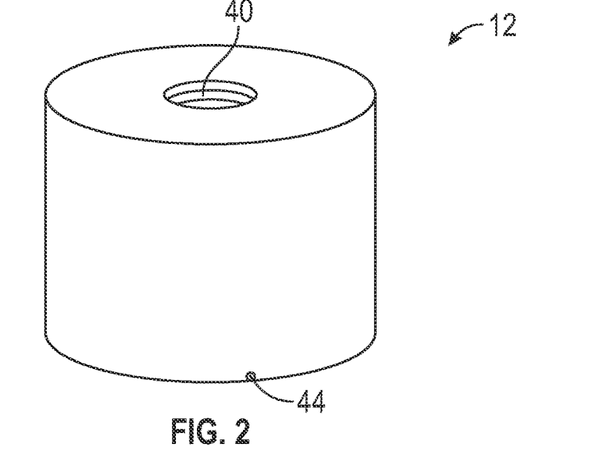
FIG. 2 is a perspective view of an example test article to be tested using the vibration testing system.
Figure 4:
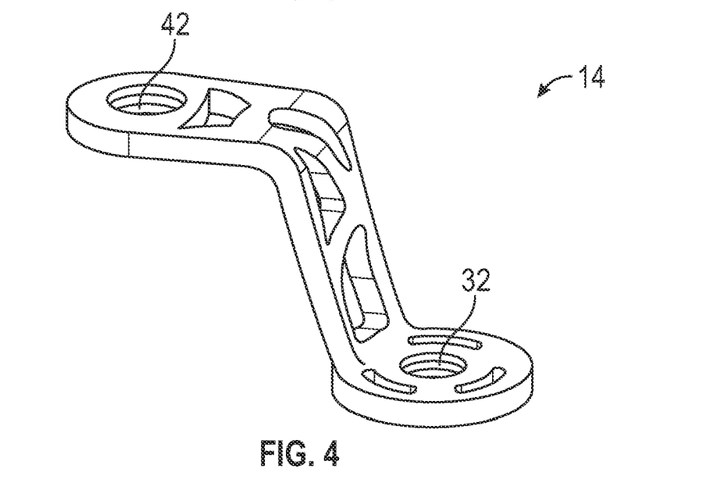
FIG. 4 is a perspective view of a test fixture included in the vibration testing system and designed according to the methods of FIGS. 9 and 10 and configured to fix the test article of FIG. 2 to the vibration slip table of FIG. 1.
Figure 5:
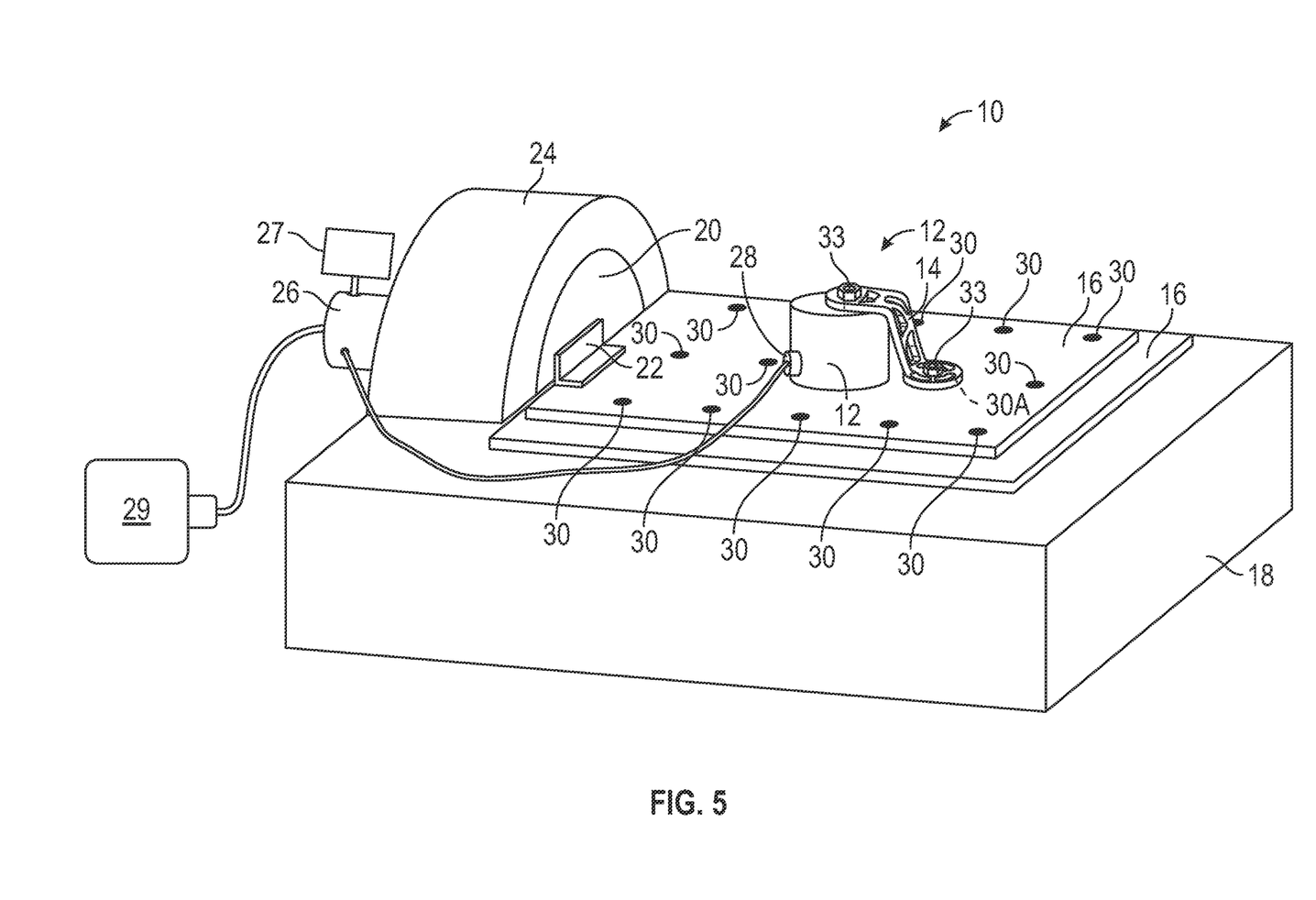
FIG. 5 is a perspective view of the vibration testing system of FIG. 1 including the test fixture of FIG. 4 fixing the test article of FIG. 2 to the vibration slip table.

Referring to the drawings, wherein like reference numbers refer to like components, FIG. 1 shows a vibration testing system 10 that is used for conducting a vibration test on a test article, such as the example test article 12 shown in FIG. 2. A test fixture 14 shown in FIG. 4 is also included in the vibration testing system 10, as shown in FIG. 5. The vibration testing system 10 includes a vibration slip table 16 disposed on a base 18 and fixed to an armature 20 via a bracket 22. The armature 20 is in turn connected to a motive source, also referred to as a shaker 24. As shown in FIG. 1, the shaker 24 can be powered by a power source 29 to move the slip table 16 in the X-Y plane (e.g., along the X axis and the Y axis shown) and to rotate about the X axis as indicated by the arrow A, according to a vibration test stored on a controller 26 that controls movement of the shaker 24. A user interface 27 allows the test conductor to input various test parameters, such as the selection of a zone of vibration frequencies for the vibration test, as described with respect to FIG. 7. One or more accelerometers 28 may be placed on the slip table 16 and/or on the test article 12 when it is fixed to the slip table 16 to provide feedback to the controller 26 during the vibration test.

The vibration testing system 10 can be used to test a variety of differently shaped and sized test articles on the slip table 16. In order to enable this versatility, the slip table 16 is provided with many different test fixture mount positions 30 at which a test fixture that fixes to the test article may be mounted. A different one or multiple different ones of the test fixture mount positions 30 are used depending upon the size and shape of the test article to be tested. Fifteen available fixture mount positions are shown in the example slip table 16. The test fixture mount positions 30 may be threaded openings, spaced apart from one another, at which a bolt may be used to fix a test fixture to the slip table 16.

Figure 3:
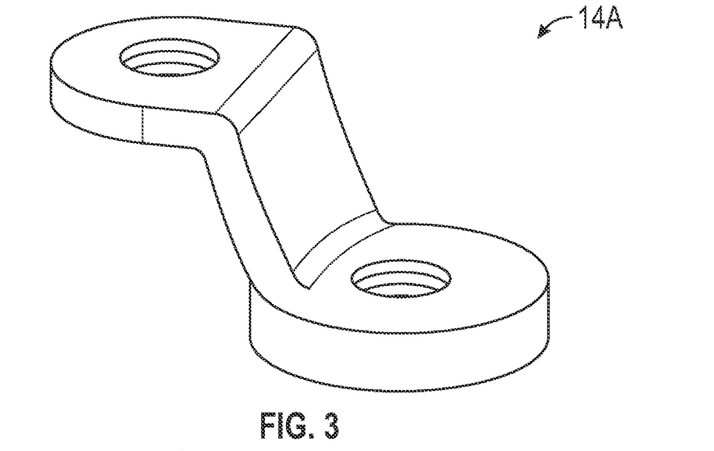
FIG. 3 is a test fixture prior to topology optimization according to the method.

Heretofore, standard test fixtures (such as test fixture 14A of FIG. 3) perform the function of fixing the various test articles to the slip table 16, but these test fixtures are not designed to minimize their impact on the results of the vibration test, as are the test fixtures designed according to the methods disclosed herein. For example, standard test fixtures are not optimized according to physical parameters of the vibration testing system, of the test article to be tested on the vibration testing system, and according to aspects of the vibration test. However, the test fixture 14 shown in FIG. 4 is designed according to the methods 800 and/or 900 shown in the flow diagrams of FIGS. 9 and 10 to improve the vibration test by minimizing the influence of the test fixture on the test results.

As discussed herein, the methods 800, 900 of designing the test fixture 14 utilize the specific test fixture mounting position(s) 30 at which the test fixture 14 will be mounted to the slip table 16 as a boundary condition in the topology optimization of the test fixture 14. For example, in FIG. 5, the test fixture 14 is mounted at test fixture mounting position 30A of FIG. 1, one of the test fixture mounting positions 30, by a bolt 33 extending through a threaded opening 32 of the test fixture 14 to secure the test fixture 14 to the slip table 16 at the test fixture mounting position 30A. The specific test fixture mounting position 30, such as test fixture mounting position 30A, may be measured relative to a designated origin 34 on the slip table 16, such as a corner of the slip table 16, for example, shown in FIG. 1. Some fixtures are secured to the slip table 16 at multiple test fixture mounting positions 30, in which case each of the test fixture mounting positions 30 are boundary conditions of the topology optimization of the methods 800, 900.

Referring again to FIG. 2, the test article 12 has a test article mounting position 40 at which the test fixture 14 is mounted on the test article 12. The example test article 12 shown has only one test article mounting position 40. The test article mounting position 40 may be a threaded hole at which a bolt 33 may secure through a threaded opening 42 in the test fixture 14 to secure the test fixture 14 to the test article 12. Other test articles may have numerous test article mounting positions and may be secured by multiple test fixtures at the multiple test article mounting positions and/or may be secured by a test fixture that mounts to the test article at more than one mount position (e.g., has multiple threaded holes and is secured to the test article by multiple bolts). For example, relatively large test articles and test articles with irregular shapes may utilize multiple test fixtures. The test article mounting position 40 may be measured relative to a designated origin on the test article 12, such as origin 44 indicated in FIG. 2. The methods 800, 900 of designing the test fixture 14 utilize the one or more specific test article mounting positions 40 at which the test fixture 14 will be mounted to the test article 12 as a boundary condition in the topology optimization of the test fixture 14. If a test fixture is to be secured to a test article at multiple test article mounting positions 40, each of the test article mounting positions is a boundary condition under the methods 800, 900.

An aspect of the vibration test stored in the controller 26 of the vibration testing system 10 may also be used as a boundary condition in optimizing the topology of the test fixture 14 according to the methods 800, 900. During the vibration test, a resonance scan is conducted on the test article undergoing the test. The resonance scan is conducted over a range of vibration frequencies from a predetermined minimum frequency of vibration to a predetermined maximum frequency of vibration. For example, the resonance scan may subject the test article to a sinusoidal frequency of vibration starting from 5 Hertz (the predetermined minimum frequency of vibration) and increasing to 2000 Hertz (the predetermined maximum frequency of vibration) and then decreasing back down to 5 Hertz. A boundary condition applied during the methods 800, 900 of designing the test fixture 14 discussed herein may include a requirement that the test article 14 has a natural frequency of vibration greater than the predetermined maximum frequency of vibration of the resonance scan of the test article 12 conducted during the vibration test. With this boundary condition, the resulting test fixture 14 will not contribute to resonance occurring during the scan, and any resonance can thus be more accurately attributed to the test article 12.

Another additional boundary condition that may be applied during the methods 800, 900 discussed herein is a material strength characteristic of the material chosen for the test fixture 14. For example, a higher strength material will be able to withstand the forces to which it is subjected with less volume than a lower strength material. Accordingly, a tensile strength of the selected material for the test fixture 14 may be a boundary condition of the finite element analysis employed in the methods 800, 900.

Figure 6:
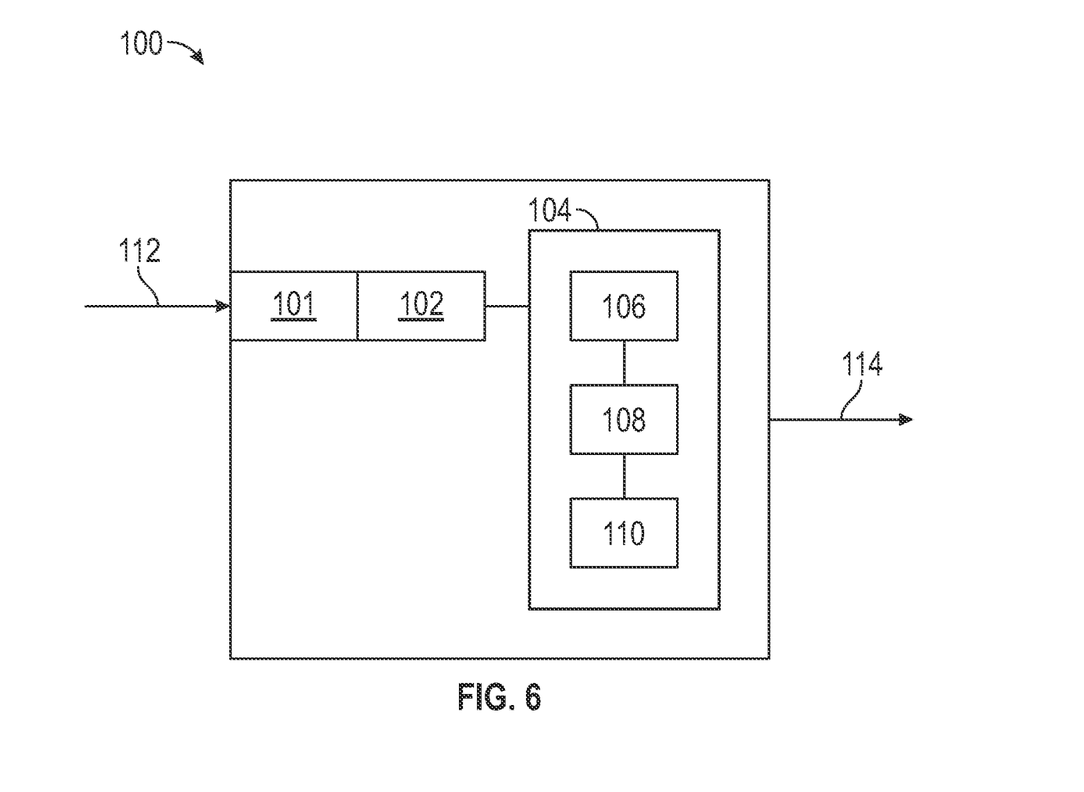
FIG. 6 is a diagram of a computer system having a topology optimizing module used to design the test fixture of FIG. 4.

FIG. 6 is a schematic diagram of a computer system 100 used in conducting the methods 800, 900. The computer system 100 includes a memory 102 and a processor 104, as well as other associated hardware and software, e.g., a clock or timer, input/output circuitry, etc. For example, instructions embodying the method 800 and portions of the method 900 implemented by the computer system 100 may be programmed as computer-executable instructions into the memory 102 and executed by the processor 104 to provide the geometric design of the test fixture 14 having the optimized topology. The memory 102 may include read only memory (ROM), random access memory (RAM), electrically-programmable read only memory (EPROM). The computer system 100 may also include a high-speed clock, analog-to-digital (A/D) and digital-to-analog (D/A) circuitry, input/output circuitry and devices (I/O), as well as appropriate signal conditioning and buffering circuitry.

The processor 104 may also include a number of modules 106, 108, and 110 that store a number of algorithms or computer executable instructions needed to perform the methods 800, 900 according to the present disclosure. The computer system 100 receives inputs 112 corresponding with inputs entered by a designer that may be entered via a user interface 101 of the computer system 100 according to the method 900. The inputs 112 correspond with one or more boundary conditions utilized by a boundary condition module 106. The boundary condition module 106 may execute a stored program, such as mathematical operations, on the inputs 112 to convert the inputs 112 to the boundary condition parameters applied during the finite element analysis undertaken by the topology optimizing module.

Module 108 is a topology optimization module that includes computer executable instructions to perform a topology optimizing finite element analysis based on the boundary conditions communicated to the topology optimizing module 108 by the boundary condition module 106. A design module 110 in communication with the topology optimizing module 108 then provides a design of a topology optimized fixture, such as a computer aided design of the test fixture 14, which is provided as output 114 to the designer, such as in a computer aided design file.

The computer system 100 may implement finite element analysis in the topology optimizing module 108. There are various methods of optimization such as shape optimization, geometric properties optimization and material properties optimization. Topology optimization primarily deals with the best distribution of material. An optimal structure is generated by reducing material out of a given volume of material. Some topology optimization methods that may be used by the topology optimization module 108 include a density based-method, evolutionary structural optimization, and a level set method (LSM). The density-based method deals with transformation of a 0-1 discrete optimization into a continuous optimization problem. Alternatively, the LSM can be used for high-dimension level set functions to describe a structural boundary condition.

The user interface 27 enables the selection of one of many different zones of vibration frequencies for testing of different test articles. For example, different components of an aircraft are subjected to different magnitudes of G-forces and associated ranges of vibration frequencies when in use, in part depending on the location of the components in the aircraft, the weight of the component, etc. When any such component is to be tested by the vibration testing system 10, the controller 26 enables the vibration test to be conducted to meet a g-load requirement of the component when in use. The vibration frequencies under the different zones create different magnitudes of g-loads on the test article. Stated differently, the magnitude of the g-loads are different for each zone. The selection of a specific one of the zones of vibration frequencies ensures that the vibration test subjects the test article to g-loads at least as large in magnitude as the g-load requirement of the specific test article.

Figure 7:
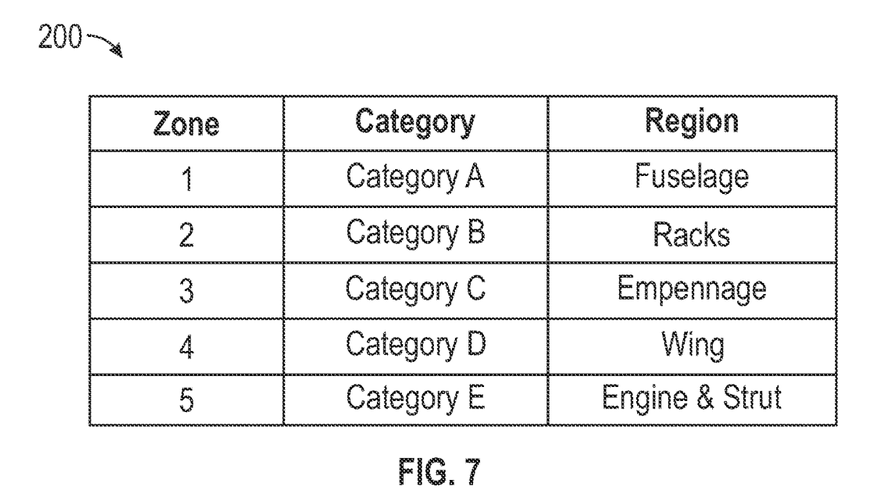
FIG. 7 is an example of zones of vibration frequencies stored in the computer system of FIG. 6 and to be selected according to the methods of FIGS. 9 and 10.

The different zones of vibration frequencies available in the vibration testing system 10 for selection by the test conductor via the user interface 27 are also stored in the computer system 100 of FIG. 6 as the selected zone is indicative of a boundary condition used by the topology optimization module 108, as discussed herein. For example, FIG. 7 is a table 200 showing an example of five different zones of vibration frequencies, Zone 1, Zone 2, Zone 3, Zone 4, and Zone 5. Zone 1 is selected when testing a test article that is an aircraft component deemed a category A component due to the component's in-use location in the fuselage region of the aircraft. Zone 2 is selected when testing a test article that is an aircraft component deemed a category B component due to the component's in-use location in the racks region of the aircraft. Zone 3 is selected when testing a test article that is an aircraft component deemed a category C component due to the component's in-use location in the empennage region of the aircraft. Zone 4 is selected when testing a test article that is an aircraft component deemed a category D component due to the component's in-use location in the wing region of the aircraft. Zone 5 is selected when testing a test article that is a component deemed a category E components due to the component's in-use location in the engine and strut region of the aircraft.

Figure 8:
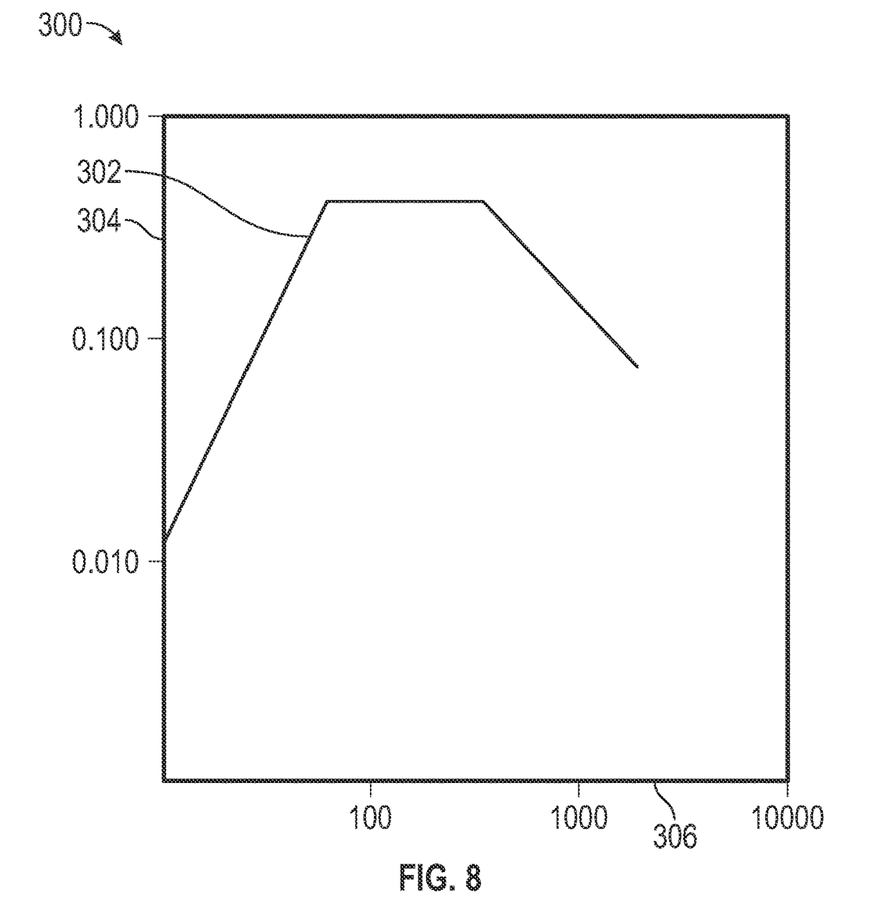
FIG. 8 is an example of a power density curve stored in the computer system of FIG. 6.

Each of the Zones 1-5 of FIG. 7 has a power spectral density curve associated with it that is stored in the controller 26 and represents the vibration test to which the test article 12 will be subjected. A plot 300 of an example of one such stored power spectral density curve 302 is shown in FIG. 8. The power spectral density curve is in log-log format and shows acceleration in units of G-squared per Hertz on the Y-axis 304, and frequency in Hertz on the X axis 306.

The methods 800 and 900 discussed herein utilize a g-force (i.e., a magnitude of acceleration) as a boundary condition in the topology optimization of the test fixture, and the g-force is converted from the power spectral density curve associated with the selected zone of vibration. Stated differently, the g-force requirement for which the vibration test is designed to subject the test article 12 is used as a boundary condition in designing the test fixture 14 that will fix the test article 12 to the slip table 16 during the vibration test.

Figure 9:
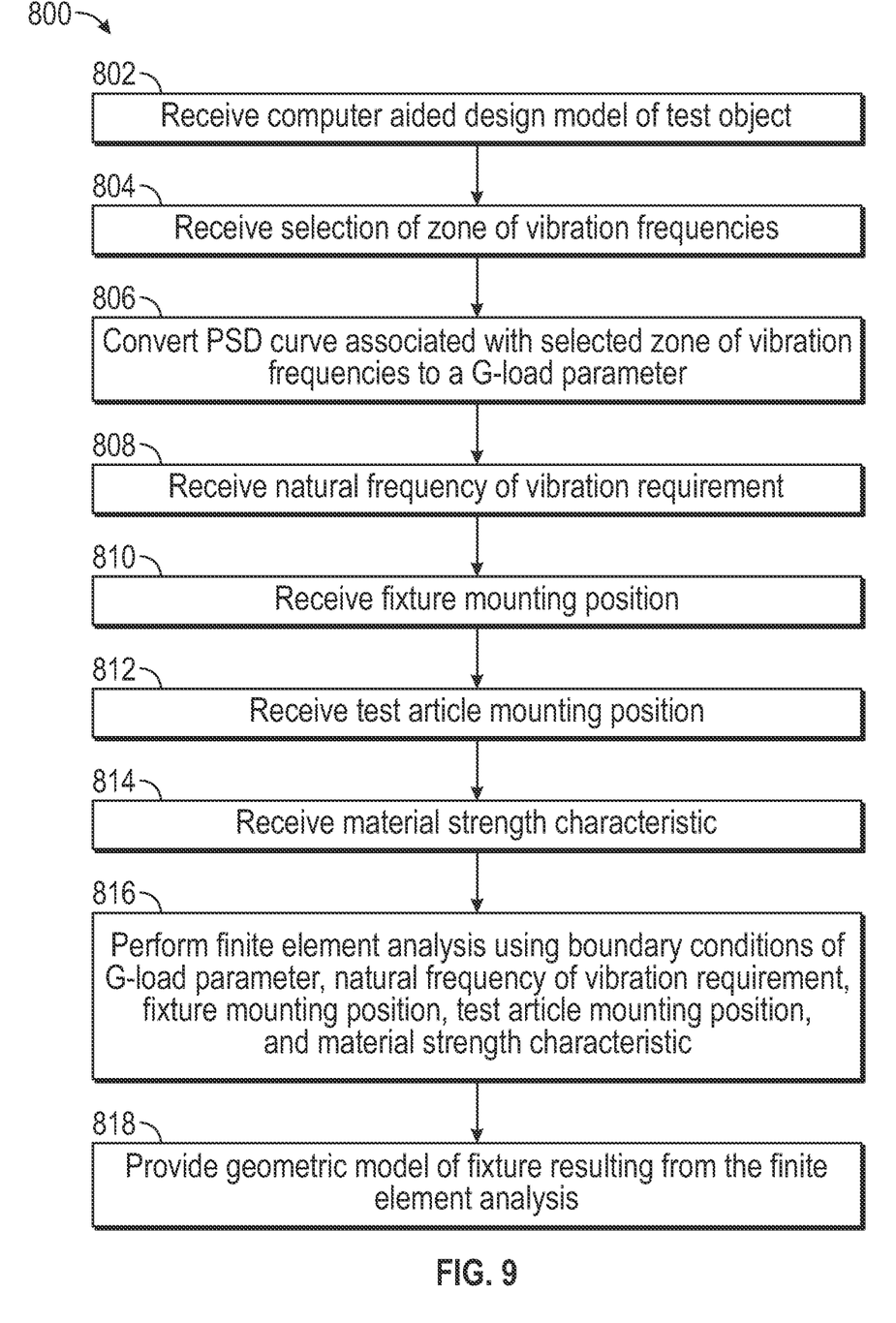
FIG. 9 is a flow diagram of an illustration of operations carried out by the computer system of FIG. 6 in one embodiment of a method of designing the test fixture of FIG. 4 for testing the test article of FIG. 2 on the vibration testing system of FIG. 1.

FIG. 9 is a flow diagram of an illustration of operations performed in one embodiment of a method 800 of designing the test fixture 14 of FIG. 4 for testing the test article 12 of FIG. 2 on the vibration testing system 10 of FIG. 1 as carried out by the computer system 100 of FIG. 6.

The method 800 begins with step 802, in which the computer system 100 receives the computer aided design model of the test article 12, such as via user inputs 112, received as electrical signals, for example. In some embodiments, a preliminary computer aided design of the test fixture (such as a computer aided design of the non-optimized test fixture 14A) may also be received by the computer system.

In step 804 of the method 800, the computer system receives a selection of the zone of vibration frequencies as an input 112. The zones of vibration frequencies may be stored in the memory 102. For example, the input 112 would be the same as the selection that would be made at the user interface 27 to select one of the Zones of FIG. 6. The table 200 may appear at a user interface 101 of the computer system 100 to allow the designer to select one of the Zones 1-5.

Following step 804, the computer system 100 performs step 806 in which the computer system 100 converts data representing a stored power spectral density curve associated with the selected zone of vibration frequencies to a g-load parameter. As discussed herein, this g-load parameter represents a g-load requirement of the test article 12. Step 804 may be performed by the boundary condition module 106.

In step 808 of the method 800, the computer system 100 receives a natural frequency of vibration requirement of the test fixture. This natural frequency of vibration requirement will be a magnitude of natural frequency of vibration greater than a predetermined maximum frequency of vibration of a resonance scan of the test article 12 conducted during the vibration test. The maximum frequency of vibration may be dependent upon the selected zone of vibration frequencies. Accordingly, the computer system 100 may determine this requirement from the selected zone received in step 804, or the magnitude may be an input 112 received from the test conductor.

In step 810 of the method 800, the computer system 100 receives the test fixture mounting position 30A. This may be received as an input 112 of the test conductor.

In step 812 of the method 800, the computer system 100 receives the test article mounting position 40. This may be received as an input 112 of the test conductor or as a calculation based on the input of the computer aided design of the test article 12.

In step 814 of the method 800, the computer system 100 receives the material strength characteristic of the test fixture 14, such as an input 112 of a specific material, of a tensile strength value that may be associated with the specific material, or of another material strength characteristic which the topology optimized test fixture 14 is to possess.

In step 816 of the method 800, the computer system 100 performs finite element analysis using boundary conditions of the boundary condition module 106, such as the g-load parameter determined in step 806, the natural frequency of vibration requirement received in step 808, the test fixture mounting position received in step 810, the test article mounting position received in step 812, and the material strength characteristic received in step 814. For example, in the embodiment shown, step 816 is performed by the topology optimization module 108.

In step 818 of the method 800, the computer system 100 provides a geometric model of the topology optimized fixture resulting from the finite element analysis of step 816, such as a geometric computer aided design model of the test fixture 14. For example, the design module 110 of the computer system 100 may provide the geometric model as a computer aided design file. The resulting topology optimized test fixture 14 may have a web-like construction as shown in FIG. 4 indicative of its minimized volume and mass (e.g., lower than that of the non-optimized fixture 14A) that nevertheless satisfies the boundary conditions according to which the topology optimized test fixture 14 is designed.

Figure 10:
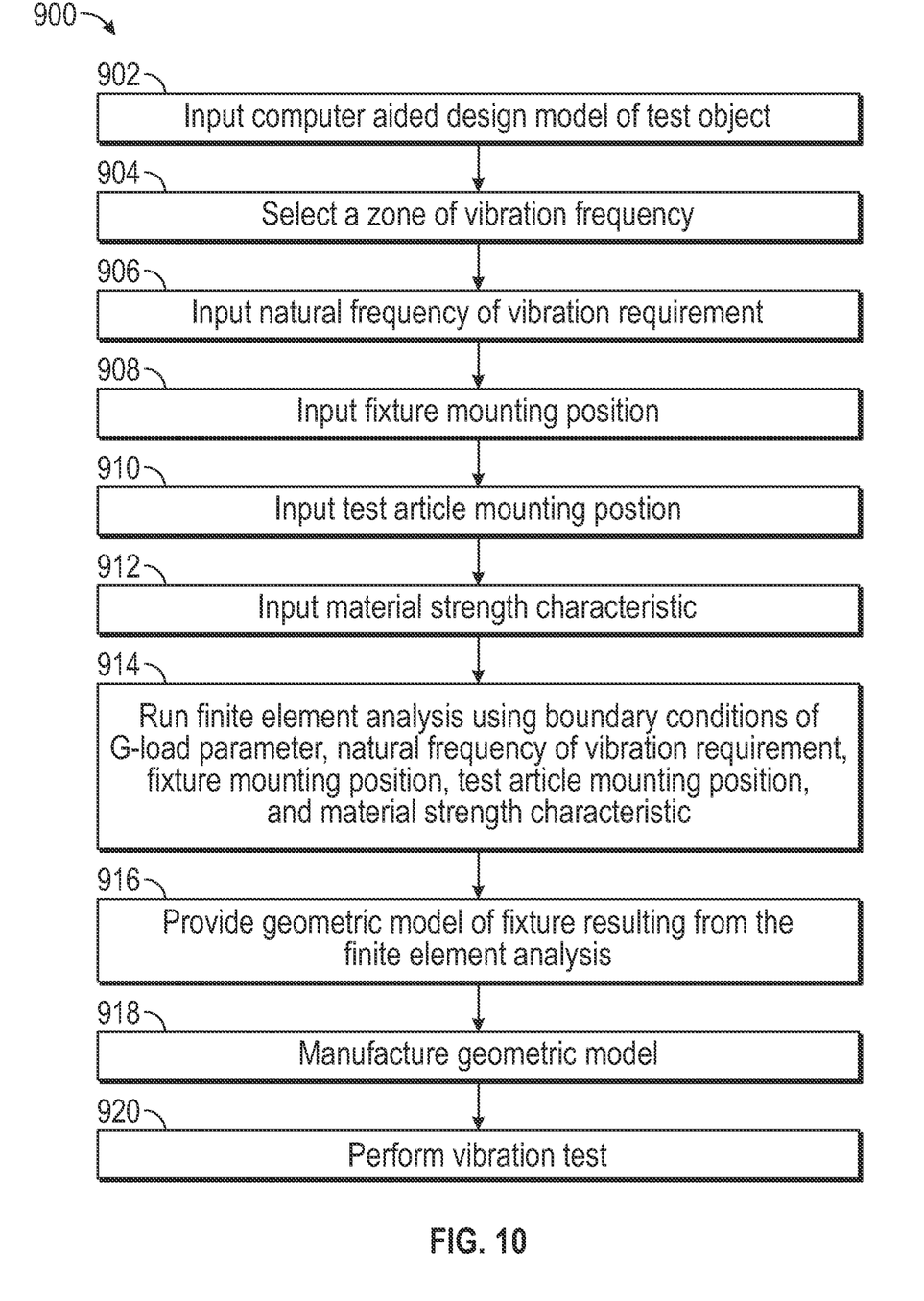
FIG. 10 is an illustration of operations performed by a designer in another embodiment of a method of designing the test fixture of FIG. 4 for testing the test article of FIG. 2 on the vibration testing system of FIG. 1.

FIG. 10 is an illustration of operations performed by a designer using the computer system 100 (as opposed to operations performed by the computer system 100) in another embodiment of a method 900 of designing the test fixture 14 of FIG. 4 for testing the test article 12 of FIG. 2 on the vibration testing system 10 of FIG. 1.

In step 902 of the method 900, the designer inputs into the computer system 100 a computer aided design model of the test article 12 to be tested on the vibration testing system 10, such as a computer aided design file of the test article 12. The inputs of the designer under the method 900 may be made at a user interface 101 of the computer system 100.

In step 904 of the method 900, the designer selects a zone of vibration frequency. For example, the table 200 may appear at the user interface 101 of the computer system 100 to allow the designer to select one of the Zones 1-5.

In step 906 of the method 900, the designer inputs a natural frequency of vibration requirement of the test fixture 14. The designer inputs a natural frequency of vibration requirement that is a magnitude of natural frequency of vibration greater than a predetermined maximum frequency of vibration of a resonance scan of the test article 12 conducted during the vibration test. Alternatively, the natural frequency of vibration requirement may be indirectly input by the designer via the input of the selected zone of frequency vibrations.

In step 908 of the method 900, the designer inputs the one or more fixture mounting positions at which the test fixture 14 is to be mounted to the slip table 16. For example, for the test article 12, the test fixture will be mounted at test fixture mounting position 30A.

In step 910 of the method 900, the designer inputs the test article mounting position at which the test fixture is mounted to the test article. For example, on the test article 12, the test article mounting position 40 is input by the designer or as a calculation based on the input of the computer aided design of the test article 12 of step 902.

In step 912 of the method 900, the designer inputs the material strength characteristic of the test fixture 14, such as by inputting a specific material that the test fixture is to be manufactured from, or by inputting a tensile strength value that may be associated with a specific material, or by inputting another material strength characteristic which the topology optimized test fixture 14 is to possess.

In step 914 of the method 900, the designer runs the finite element analysis of the topology optimization module 108 of the computer system 100 using the boundary conditions of the g-load parameter of step 904, the natural frequency of vibration requirement of step 906, the test fixture mounting position of step 908, the test article mounting position of step 910, and the material strength characteristic of step 912. The designer may run the finite element analysis in step 914 by directing the analysis to be started, such as by clicking on a run or start button on the interface of the computer system 100.

In step 916 of the method 900, the designer receives a geometric model of the test fixture 14 resulting from the finite element analysis of step 914. The geometric model is thus of a topology optimized test fixture 14. The geometric model may be a computer aided design file of the test fixture 14.

In some examples, the method 900 ends at step 916 as the designer has completed the design of the test fixture 14. Optionally, steps 918 and 920 may be performed under the method 900 by the designer or by another entity.

In step 918 of the method 900, the designer, or another who receives the geometric model from the designer, manufactures the test fixture 14 according to the geometric model. For example, the manufacturing of the test fixture 14 may be via a machining or via additive manufacturing.

In step 920 of the method 900, the designer, or another who obtains the test fixture 14 manufactured in step 918, performs the vibration test on the test article 12 using the vibration testing system 10 including the manufactured, topology optimized test fixture 14.

Accordingly, the vibration testing system 10 including a test fixture such as test fixture 14 designed according to the methods 800 and 900 herein enables more efficient vibration testing of components as the topology of the test fixture 14 is optimized so that the test results are reflective of the test article 12 tested. Additionally, the weight of the test fixture 14 is minimized, allowing for lighter weight slip tables 16 and easing the logistics of the setup and/or moving of a vibration test system 10 that uses the test fixtures designed according to the methods 800, 900.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method of designing a test fixture configured to mount to a vibration slip table and fix a test article to the vibration slip table during a vibration test, the method comprising:
   performing finite element analysis via a topology optimizing module of a computer system using one or more boundary conditions determined from parameters of the vibration slip table, the test article, or the vibration test to optimize a topology of the test fixture; and
   outputting from the topology optimizing module a geometric model of the test fixture having the optimized topology;
   wherein a motive source vibrates the vibration slip table during the vibration test;
   wherein the one or more boundary conditions include a g-load parameter; and
   wherein the g-load parameter is converted from a selected power spectral density curve according to which the motive source is powered to vibrate the vibration slip table during the vibration test.

2. The method of claim 1, wherein the selected power spectral density curve is one of a plurality of power spectral density curves, each of the power spectral density curves corresponding with a different zone of vibration frequencies; and wherein the zone of vibration frequencies of the selected power spectral density curve corresponds with a predetermined g-load requirement of the test article.

3. The method of claim 1, wherein the one or more boundary conditions include a natural frequency of vibration of the test fixture greater than a predetermined maximum frequency of vibration of a resonance scan of the test article conducted during the vibration test.

4. The method of claim 1, wherein the one or more boundary conditions include a test fixture mounting position at which the test fixture is mounted on the vibration slip table.

5. The method of claim 1, wherein the one or more boundary conditions include a test article mounting position at which the test fixture is mounted on the test article.

6. The method of claim 1, wherein performing the finite element analysis further includes using a material strength characteristic of a material of the test fixture as an additional boundary condition.

7. A method of designing a test fixture for a vibration test system, the method comprising:
   inputting into a computer system one or more boundary conditions determined from parameters of a vibration slip table, a test article, or a vibration test; wherein the vibration test system includes the vibration slip table and a motive source, the test fixture is configured to mount to the vibration slip table and fix the test article to the vibration slip table during the vibration test; wherein the motive source vibrates the vibration slip table during the vibration test;
   wherein a topology optimizing module of the computer system is configured to perform finite element analysis based on the one or more boundary conditions to provide a geometric model of the test fixture having an optimized topology;
   wherein the one or more boundary conditions include a power spectral density curve according to which the motive source is powered to vibrate the vibration slip table during the vibration test; and
   wherein the topology optimizing solver converts the power spectral density curve into a g-load parameter.

8. The method of claim 7, wherein the one or more boundary conditions include:
   a natural frequency of vibration of the test fixture greater than a predetermined maximum frequency of vibration of a resonance scan of the test article conducted during the vibration test.

9. The method of claim 7, wherein the one or more boundary conditions include:

a test article mounting position at which the test fixture is mounted on the test article.

10. The method of claim 7, wherein the one or more boundary conditions include:
a test fixture mounting position at which the test fixture is mounted on the vibration slip table.

11. The method of claim 7, further comprising:
inputting into the computer system a material strength characteristic of a material of the test fixture; wherein the topology optimizing module of the computer system utilizes the material strength characteristic as an additional boundary condition in performing the finite element analysis to provide the geometric model of the test fixture.

12. The method of claim 7, further comprising:
manufacturing the test fixture according to the geometric model provided by the topology optimizing solver.

13. The method of claim 12, wherein manufacturing the test fixture is via machining or via additive manufacturing.

14. The method of claim 12, further comprising:
performing the vibration test on the test article using the vibration testing system including the manufactured test fixture.

15. A vibration testing system for conducting a vibration test on a test article comprising:
a vibration slip table;
a test fixture configured to mount to the vibration slip table and configured to fix the test article to the vibration slip table; and
a motive source operatively connected to the vibration slip table and operable to vibrate the vibration slip table;
wherein the test fixture has a topology optimized according to a finite element analysis performed using one or more boundary conditions determined from parameters of the vibration slip table, the test article, or the vibration test;
wherein the one or more boundary conditions include a g-load parameter; and
wherein the g-load parameter is converted from a power spectral density curve according to which the motive source is powered to vibrate the vibration slip table during the vibration test.

16. The vibration testing system of claim 15, wherein the one or more boundary conditions include a natural frequency of vibration of the test fixture greater than a predetermined maximum frequency of vibration of a resonance scan of the test article conducted during the vibration test.

17. The vibration testing system of claim 15, wherein the one or more boundary conditions include at least one of:
a test fixture mounting position at which the test fixture is mounted on the vibration slip table; and
a test article mounting position at which the test fixture is mounted on the test article.

* * * * *